United States Patent [19]

Trojan et al.

[11] Patent Number: 5,297,032
[45] Date of Patent: Mar. 22, 1994

[54] SECURITIES TRADING WORKSTATION

[75] Inventors: Donald R. Trojan, New Canaan, Conn.; Edward F. Keenan, III, Franklin Square; Henry Hyatt, Glendale, both of N.Y.

[73] Assignee: Merrill Lynch, Pierce, Fenner & Smith Incorporated, New York, N.Y.

[21] Appl. No.: 649,761

[22] Filed: Feb. 1, 1991

[51] Int. Cl.$^5$ .............................................. G06F 15/30
[52] U.S. Cl. ............................... 364/408; 340/825.26
[58] Field of Search ....................... 364/401, 406, 408; 340/825.26, 825.27

[56] References Cited

PUBLICATIONS

Weaver, "Critical Financial Market Systems", 1990, 4/1–4/3.
Landis, "Multi-Talented System Opens Windows for Trader's World", Wall Street Computer Review, Apr. 1988, pp. 86–89, 93.
"Apollo Weds Contessa", Computer World, Jun. 1, 1987, p. 41.
"Frankfurt Advances Technology: Bourse Automates", Communications Week International, May 13, 1991, p. 18.
"Aria to Offer Mac Trading System", PC Week, Mar. 8, 1988, p. 5.
Matthew, "OTC Success Spurs Specalized Trading Systems", Wall Street Computer Review, Sep. 1989, pp. 26–38.

Primary Examiner—Roy N. Envall, Jr.
Assistant Examiner—Jennifer L. Hazard
Attorney, Agent, or Firm—Hopgood, Calimafde, Kalil, Blaustein, & Judlowe

[57] ABSTRACT

A work station for use by a trader of securities on an established market. The work station is integrated into a network of competing market makers for a plurality of securities for trading. A centralized database provides a feed of data on current market events for the securities, including price and transaction data. The work station is specifically programmed to receive the feed of data from the database and convert this datastream into a form conducive to enhanced trading. Seven separate applications permit the trader to track the market, select securities, bid and ask pricing, market direction and market depth. Traders equipped with the workstation are capable of entering transactions with more complete and copious knowledge about the extant market.

8 Claims, 10 Drawing Sheets

SECURITIES TRADING WORKSTATION

The present invention generally relates to a data processor used to support the trading of select securities and more particularly, an integrated work station that supports a plurality of applications for enhanced implementation of OTC securities trading operations.

BACKGROUND OF THE INVENTION

The trading of financial instruments such as stocks and bonds has largely become a computer supported operation. Almost all significant trading of securities is accomplished by computer pursuant to the established protocols of the major exchanges. For example, on the New York Stock Exchange, orders for specific securities are entered at a terminal operated by a licensed agent with a "seat" on the exchange. This order is processed through a stock "specialist", a firm that is obligated to manage transactions for a given security. The specialist clears the trade at a price reflecting the current supply-demand environment for that security. Upon confirmation of the trade, the parties up-date their respective positions via computer controlled memory. For the most part, the above transaction is accomplished through computer terminals linked together by communication busses or telephone lines.

A different arrangement is provided for certain over the counter trading associations of which NASDAQ (National Association of Securities Dealers) is probably the most prominent. These exchanges avoid the use of specialists in specific stocks and membership does not invoke a seat on an exchange. To the contrary, NASDAQ is established as a computer integrated market of select securities, wherein members trade as agents for their customers and make markets in specific securities themselves. To operate effectively in this environment, the members must have a sophisticated communication system that permits entry and up-dating of current stock positions supporting the desired transactions. This involves the creation and operation of a central on-line database for the securities to be transacted.

Members enter into the NASDAQ database via a remote terminal and input their requests. For example, if a dealer represents a prospective buyer of stock in Apple Computer, this dealer inputs a request for e.g., 100 shares of Apple stock at a "bid" price of $44.00. This information is recorded into the database and becomes available to other participants including those making a market in Apple stock at a certain "ask" price. If an agreed price is received, a deal is confirmed and the respective positions of the parties up-dated.

These operations are heavily dependent on appropriately programmed computer systems. For example, see U.S. Pat. No. 4,674,044 to Kalmus, et al., titled "Automated Securities Trading System". The teachings of this patent are incorporated herein as if restated in full. This system provides automated securities trading at established parameters for the buyer and seller. In addition to supporting such transactions, dealers also participate in making markets in individual securities, i.e., the dealer is also the principal and sells the securities out of dealer inventory.

The above operations are performed in real time with the participation of hundreds of competing buyers and sellers forming a highly competitive environment. A central element to success in such a market is the rapid access to vital information on current market conditions in terms of market depth and recent swings and the ability to enter quickly to establish or withdraw a price. For example, a trend away from a given security is first indicated by a drop of market makers on the inside market. Participants with an early indication of the souring market are in the best position to profit therefrom (or reduce their exposure).

In the past, the traders were largely dependent on information supplied directly from the database of transactions in a form selected primarily for ease in communication. Although the on-line data was rich with salient market information, the form of this data simply was not optimized to permit rapid extraction and review to support trading; to the contrary, this feed data was mostly devoid of trend information in the market and the traders had to mostly rely on intuition and luck in predicting market shifts. The recognition of this inhibition formed the impetus to the present invention.

SUMMARY AND OBJECTS TO THE PRESENT INVENTION

It is an object of the present invention to provide a system for organizing substantial streams of transactional data into a form providing detailed information in real time to securities traders.

It is also an object of the present invention to provide an integrated data processing system that is in communication with an on-line database for securities transactions and receives a datastream of information involving the transactional activity of a plurality of securities, processing the incoming information in a manner that increases trader performance.

It is another object of the present invention to provide a work station in communication with an on-line securities database that permits the tracking of numerous individual stocks, develops trend information based thereon, measures the depth of the market and displays in real time select trade support parameters to the trader.

It is a further object of the present invention to provide a multi-tasking work station that includes seven primary applications each of which is set in a windowed interface for implementing a plurality of security based transactional operations.

It is still another object of the present invention to provide a work station for use by an OTC trader capable of updating the market for select securities, provides trend analysis regarding shifts in the inside market for specific stocks, provides information on the number of active market makers for a specific stock, and permits transactions through the dealer network.

The above and other objects of the present invention are realized in a specific illustrative OTC trader system. The system is linked to a remote separately commanded database that outputs a datastream of information in a pre-set form. This datastream is received in real time and segmented into discrete files, formatted in a manner consistent with the applications of the work station. The pre-formatted datastream is stored in file servers known as digital interface servers (DIS). Several servers are used and each server is capable of supporting up to sixteen individual work stations simultaneously.

The work stations are each pre-programmed with the specific applications software permitting enhanced OTC trading. These applications are displayed and operated concurrently on the work station by the trader in a windowed environment. In this way, each application is represented by a separate window on the system display screen forming the interface with the trader. The trader moves from the various applications by moving a screen cursor between the respective windows. The workstation employs a multi-tasking operating system that permits concurrent utilization of the different applications. In this way, trends may be monitored while an order is being entered and confirmed.

In accordance with the varying aspects of the present invention, the COMPOSITE application is customized to provide a trader's book, reflecting securities of specific interest to the user of that workstation. This window provides a listing of these securities, monitors current depth of a market by measuring the number of market makers on the inside and further determining the direction of the market by the changes of "inside" market makers. The LEVEL 2/3 application permits the tracking of a large number of individual market makers, per security; this information is presented in various arrangements, e.g., arranged by Best Bid or Best Ask Price.

The foregoing features will be more fully appreciated in view of a specific illustrative example thereof taken in conjunction with the accompanying figures of which:

DETAILED DESCRIPTION OF THE PRESENT INVENTION

Figure 1:
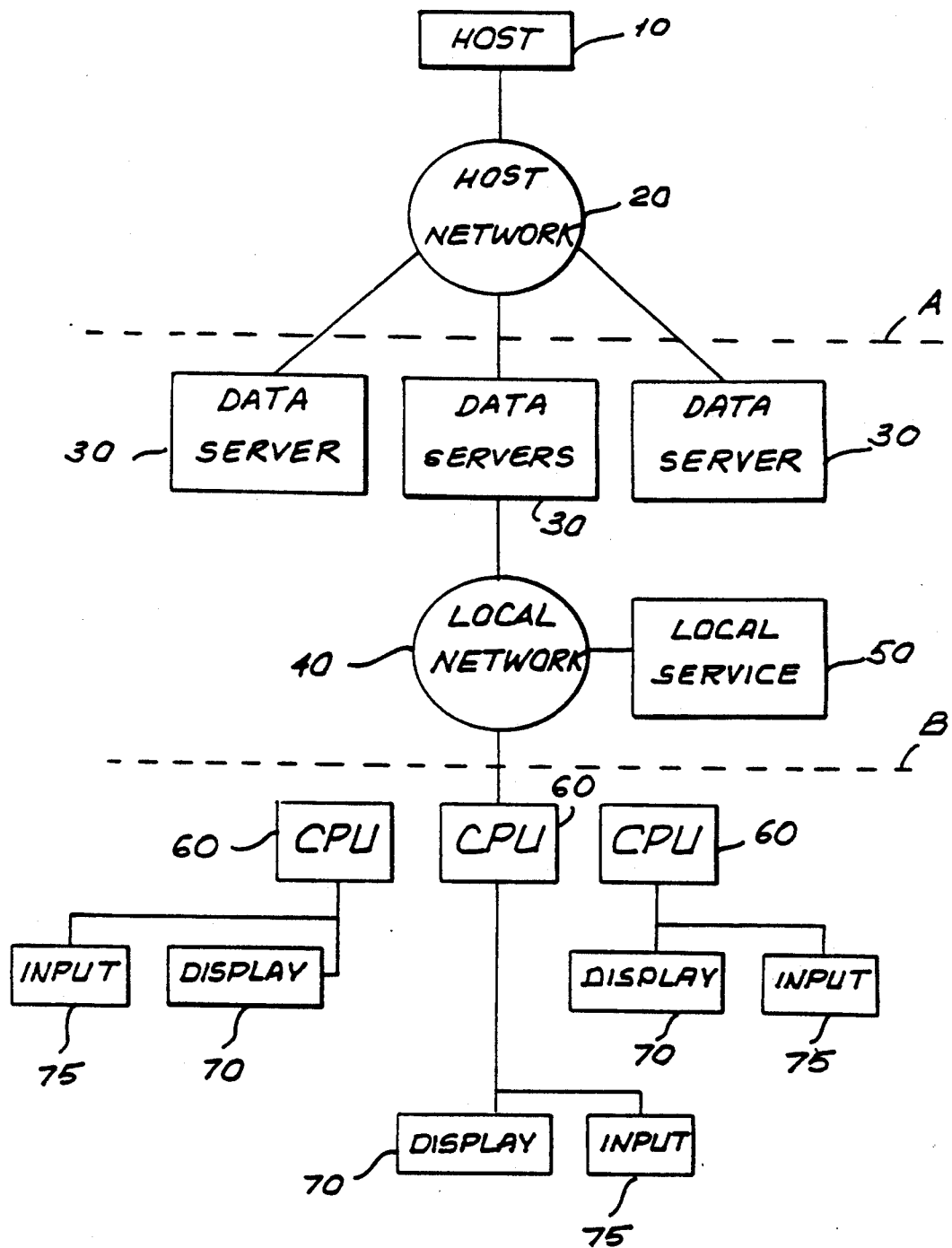
FIG. 1 provides a block diagram of the salient elements in the system matrix.

First briefly in overview, the present invention is directed to a specifically programmed data processing work station used to support an OTC trader in the performance of select securities transactions. The work station is integrated into a network supplying on-line access to a database of securities related information managed by an external organization, such as NASDAQ. Taking a hierarchial view of the integrated network, the process begins at the remote database, which is continuously updated with trade related information. The remote database as operated by NASDAQ is in communication with various trading organizations that are member dealers. A communication link between the member dealers and NASDAQ is established providing real time access to the database for purposes of retrieving continuously updated information and entering transactions.

The dealer is equipped with on-site file servers for collecting the incoming NASDAQ generated data and storing this data in a prearranged file structure. This on-site file storage system comprises several CPU controlled file servers in communication with the OTC workstations, via a per se well known network arrangement, e.g., ETHERNET.

The individual workstations are provided on the trading floor and used by traders to review current market conditions, as represented by the stream of NASDAQ generated data, and the entry of transaction requests by the trader. To support both of these functions, the workstation is programmed with seven primary applications and three ancillary support programs. The primary applications are labeled as follows:

1. LEVEL 2/3 (two windows);
2. COMPOSITE;
3. TICKER (two windows);
4. SelectNet; and
5. UNSOLICITED MESSAGES.

The three ancillary program services are as follows: interactive; hot key and configuration matrix.

Finally, the workstation includes the communications package for interaction with the file servers, and further communication with other OTC services, such as SelectNet, ACT, SOES, etc.

The above applications are processed in the workstation by addressing and updating information stored in two primary files. The first file is what is known as the traders book and provides detailed information for each security that the trader using that particular workstation is involved in tracking. The information on the securities will include current bid and ask price information as recently updated pursuant to the link with the on-line database, a listing of the organizations that are making markets in the particular securities and information regarding the involvement of the organization represented by that trader. The second file is directed to the structure and detail provided in the window display associated with each application. The information stored in this file will dictate how the on-line data regarding the various securities is presented and includes color, symbolic representations, fonts, pop-up menus, etc.

The specific applications available are integrated in a manner so that the display provides seven separate windows simultaneously to the trader. Each window represents a separate application and is governed by protocols distinct to that application. In this respect, if the trader wishes to enter commands within an individual application, he must operate on screen in that window. In this way, by moving between windows the trader is also entering and leaving different applications.

With the above overview in mind, please now refer to FIG. 1 which provides a block diagram of the functional elements associated in implementing the present invention. In this regard, Host computer 10 represents a remotely located on-line database having plural records associated with securities available for trading by member dealers. An example of Host computer 10 would be the central NASDAQ computer supporting on-line OTC trading by member dealers. The Host computer is linked, via a Host network 20, to a series of data servers located on-site within the trader's organization. In FIG. 1, the interface A is used to demarcate the locations of the Host computer and the on-line data servers 30. The data servers are continuously collecting information regarding securities from the Host computer and organizing this information in a sequence of files particular to that individual data server. In this regard, each of the data servers support a different, although possibly overlapping, collection of securities transactions.

Continuing with FIG. 1, an individual data server 30 is linked to a plurality of workstation CPUs 60 through a local area network, such as the above-mentioned ETHERNET system. In addition, access to the network is provided for maintenance, via local service 50. In FIG. 1, there are three CPUs 60 represented. Each CPU corresponds to a given trader and is individually programmed to support that trader's work. This will include the manner that the information is stored, configured and presented in addition to the selected access to securities of interest to that trader. For each CPU 60, there is also a display 70 and input 75; often, this arrangement would be localized, such as a desktop computer. In this application, it has been found that providing a centralized CPU 60 location and extending a linkage between the display and CPU is better adapted for supplying multiple terminals to a trading floor. This insures that the traders are not disturbed during maintenance and debugging operations. Therefore, the display, keyboard and transducer are located at the trader's desk and some distance from CPU 60.

The DIS (Digital Interface Servers) file servers 30 are programmed to operate in an INTEL 80386 PC based environment on PC/AT compatible bus. The DIS file server is connected to the Host, via a SNA 3270 gateway. The interface between the DIS file server and the trader workstation is a standard implementation of the TCP/IP peer-to-peer protocol. When so configured, each DIS file server can support up to 16 simultaneously and unique sessions with the NASDAQ Host computer.

The trader workstation is programmed with a UNIX operating system and is equipped with a network card corresponding to the 802.3 ETHERNET specification. To increase access performance, the ETHERNET system is subdivided in five separate segments and linked with intelligent bridges/routers. To insure proper fault tolerance, each workstation is linked to two separate local area networks.

Figure 2:
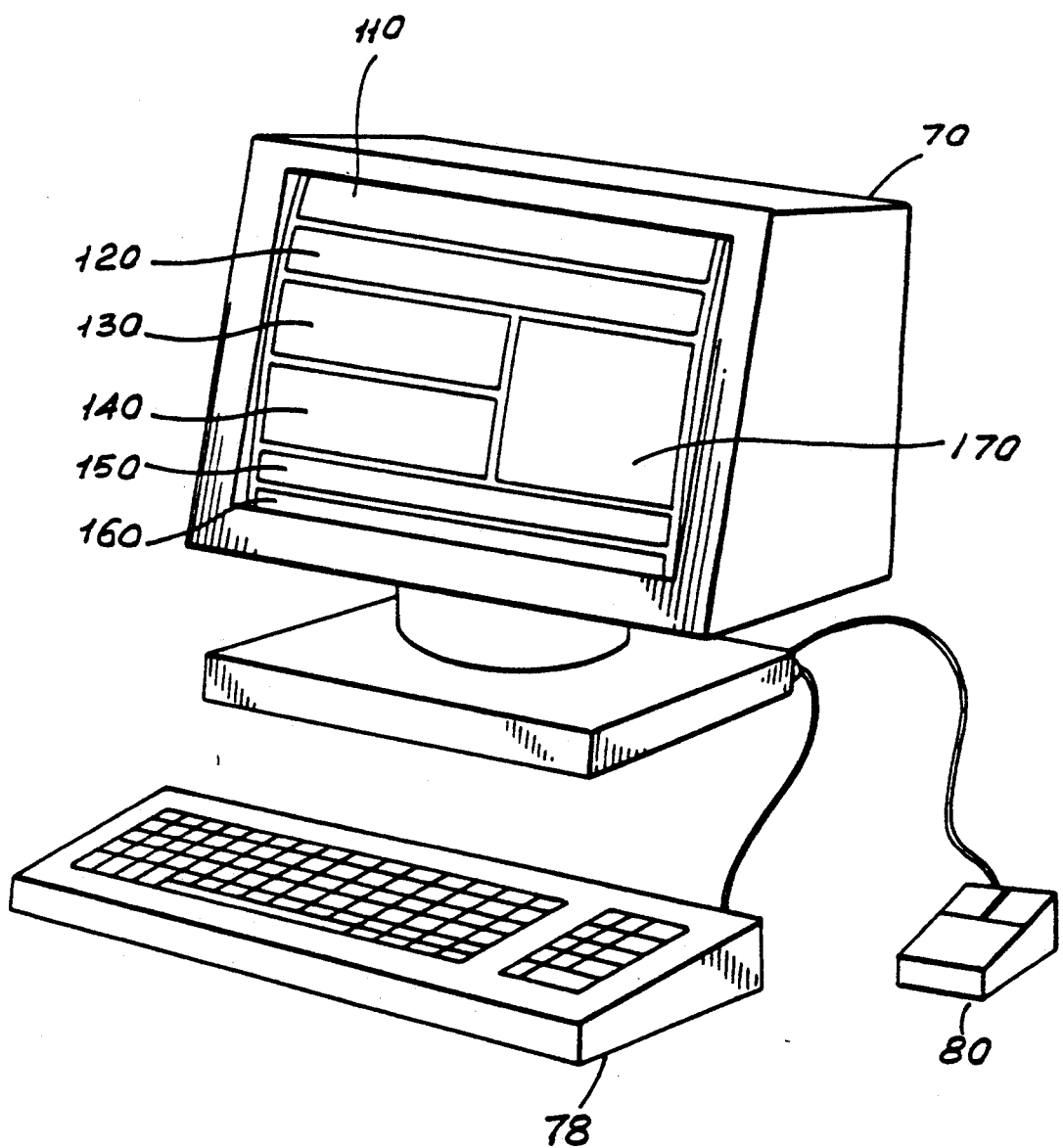
FIG. 2 depicts a workstation showing the windows used to interface with the applications of the present invention.

Turning now to FIG. 2, a simplified diagram of the workstation is presented. More particularly, and as presented in this figure, the trader's desk is equipped with a display means 70 and an input means, including keyboard 78 and transducer (mouse) 80. The display 70 provides seven separate windows corresponding to each of the seven applications supporting the trader. These windows represent the interface into the functions of each application. As stated above, the TICKER application has two separate windows—TICKER A 110 and TICKER B 120. This is also true for application LEVEL 2/3-A 130 and LEVEL 2/3-B 140. COMPOSITE 170 is positioned on the right side of the display screen and the two final windows, SelectNet 150 and UNSOLICITED MESSAGES 160, are located on the bottom portion of the screen display.

As presented in FIG. 2, the display and input system are located at some distance from the controlling CPU and the workstation. The commands entered by the trader through mouse 80 or keyboard 78 are transmitted to the CPU and the implementation of those commands is routed back to display 70, during the screen refresh cycle. As stated earlier, entry into the separate applications is accomplished by moving between the segmented windows.

The communications between the trader workstation and the DIS file server is managed by the NASD Communications Daemon (NCD), providing the interface to the NASDAQ information stream. The NCD can be considered a separate application and, as such, is directed to providing the appropriate protocols and formats for messages exchanged between the DIS file server and the workstation.

When each application is started, a handshake mechanism is invoked between the application and the NCD. If communications between the NCD and the DIS data server is properly established, the network is ready to transmit data.

Figure 3:
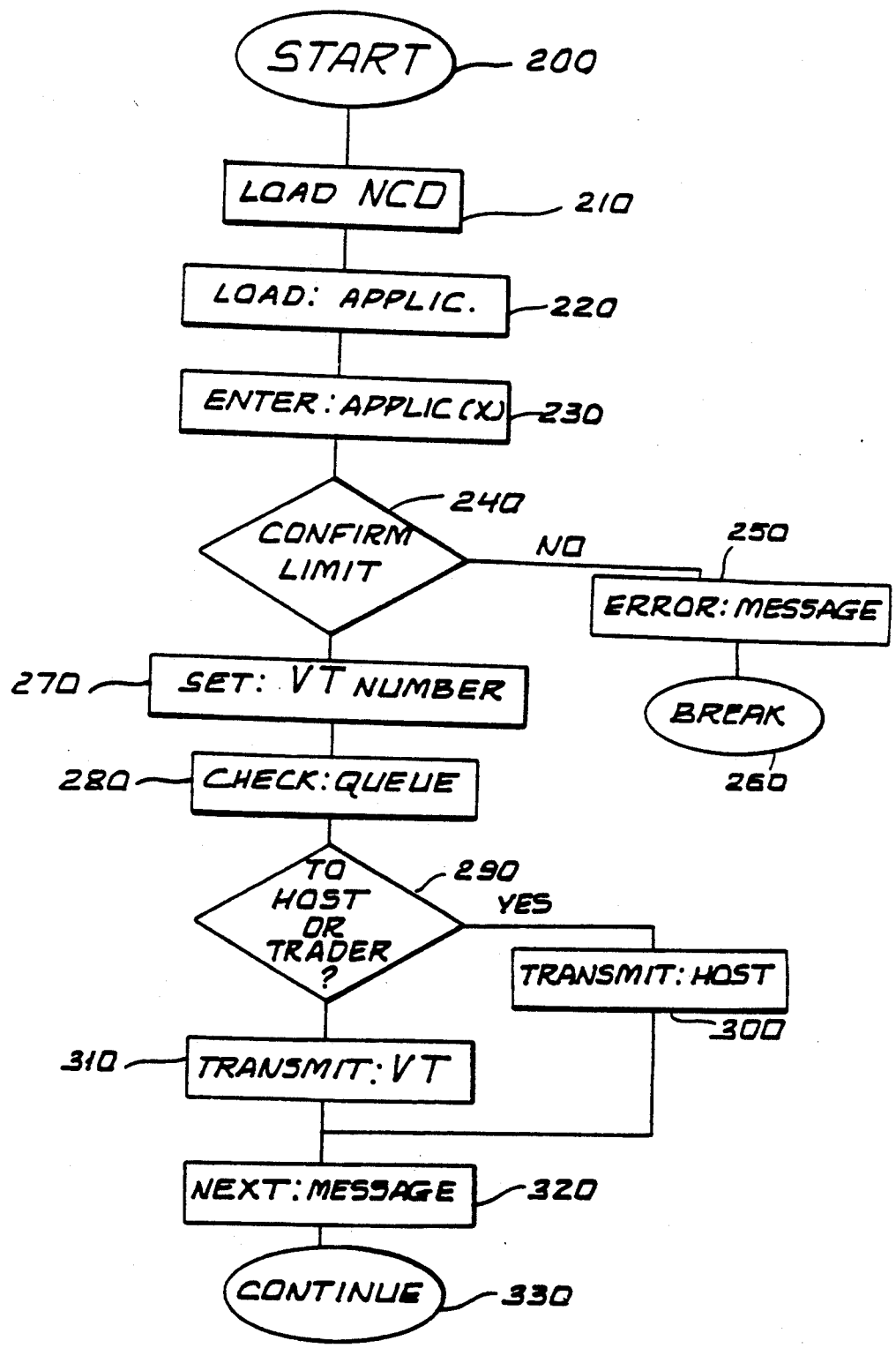
FIG. 3 provides a flow chart directed to the communications with the Host database.

Turning now to FIG. 3, implementation of the NCD communications system is presented in flow chart form. Logic begins at start block 200 indicating initialization of the system. At block 210, the system recalls the NCD application from memory and loads it into active RAM. The applications associated with the workstation are then brought up; followed by the trader's entry in a particular application's environment block 230. Logic then proceeds to test 240 which confirms linkage to the DIS data server. If the linkage cannot be confirmed ("NO" to test 240), logic branches to error message generator 250 and system break 260. Confirmation of the communication link indicates that data may be passed to and received from the DIS file servers, via the protocols and formats associated with NCD. Representative data along this channel will include registration for TICKERS, LEVEL 2/3 requests and updates, request for and receipt of forms, to cite a few examples.

Continuing in FIG. 3 at block 270, the communication channel with that workstation is established by a virtual terminal number (VT). The VT is associated with a specific workstation and is used by the NCD as an address location to send data to a specific terminal, via the terminal message queue. The message queue is a stacked memory location for resident messages awaiting display on transmission.

Continuing with FIG. 3 at block 280, the system reads the most recent queue entry in memory. Depending on the source of the message in the queue, test 290 channels the message to the appropriate destination. That is, a positive response to test 290 indicates a message originating with the trader and logic, therefore, branches to block 300 for transmission back to the Host. Alternatively, a message from the Host is channeled to the appropriate VT address, via block 310. It will be appreciated that individual workstations will only be interested in certain securities, and, therefore, most of the incoming information from the Host computer is filtered out prior to receipt at any given one workstation.

At the workstation, the on-line data is presented through the seven windowed interfaces in a manner as depicted in Table 1 below. The Table 1 representation corresponds directly to the windows presented in FIG. 2 of the workstation, except now detailed information regarding actual trades, market makers, volume bid and ask prices, etc. are presented. In overview, the top two windows in Table 1 are the TICKER applications. The first TICKER application presents current bid and ask prices for select securities. For example, the first entry in Table 1. INTC, represents Intel Corporation with a current bid price of $39\frac{1}{2}$, a current ask price of $40\frac{1}{2}$ and the market maker providing these price quotes is represented by the symbol SMDV.

TABLE 1

| INTC 39 1/2 40 1/2 SNDV | INTC 39 3/4 40 1/2 BEHR | INTC 39 3/4 40 1/2 RSSF | INTC 40  40 3/4 MONT |
|---|---|---|---|
| INTC 40  40 3/4 FBCO | INTC 39 3/4 40 1/2 UBSS | ADBE 29  30 TSCO | INTC 39 1/2 40 1/2 LABE |
| 1000 BGEN 27 3/4 SLD | 10000 SGAT 11 3/8 | 1000 ADBE 29 3/4 | 500 INTC 40 |
| 1200 MCIC 19 1/2 | 1000 INTC 40 | 1000 ADBE 29 3/4 | 2000 BSTN 2 3/16 |

| b AAPL_LA- 44 5/8 + 5/8 03.02 | APPLE COMPUTER INC | | STK | BID | ASK | # | BIDS | # | ASKS |
|---|---|---|---|---|---|---|---|---|---|
| HI- 44 3/4  LO- 43 1/2 | PCL- 44 | VL- 2090900 | ADBE | 29 1/2 | 29 3/4 | 2 | ↑ | 3 | ↓ |
| INS- 44 1/2  44 3/4 | 10- 10 MOTC- 44 | 44 3/4 | ZYSMM | 10 3/8 | 10 1/2 | 10 | | 18 | |
| | | | MSFT | 75 1/4 | 75 3/4 | 6 | ↑ | 13 | |
| SELZ  44 1/2 | SALB  44 1/2 | FBCO  44 1/2 | AGREA | 32 3/4 | 32 7/8 | 6 | | 1 | |
| HMQT 44 1/4 | PUNK 44 1/4 | MABN 44 1/4 | BETZ | 42 3/4 | 43 1/4 | 3 | | 3 | |
| BEST  44 1/4 | CANT  44 1/4 | WERT  44 1/4 | BSTN | 2 3/16 | 2 1/4 | 1 | | 3 | |
| DEAN  44 1/4 | RSSF  44 1/4 | DAIN  44 1/4 | CCXLA | 18 3/4 | 19 1/4 | 10 | | 1 | |
| DLJP  44 1/4 | OLDE  44 1/4 | #BEHRN 44 1/4 | CRAY | 4 5/8 | 4 3/4 | 9 | | 1 | ↓ |
| SNCM  44 1/4 | NAWE  44 1/4 | NEED  44 1/4 | EVRX | 4 3/8 | 4 5/8 | 9 | ↑ | 6 | ↓ |
| WARB  44 1/4 | HRZG  44 1/4 | UBSS  44 1/4 | DGSD | 1 5/8 | 1 3/4 | 2 | | 1 | |
| ABSB  44 1/4 | KPCO  44 1/4 | SHWD  44 1/4 | FULL | 30 1/2 | 31 | 1 | | 4 | |
| WSTIJ  44 1/4 | WSLS  44 1/4 | DRCO  44 | GSCC | 5 3/8 | 5 5/8 | 6 | | 3 | |
| | | | CPLS | 18 3/8 | 18 5/8 | 4 | | 4 | |
| b SUNW_LA- 22 3/8 − 1/8 02.59 | SUN MICROSYSTEMS INC | | HENG | 15 1/2 | 15 3/4 | 5 | | 2 | |
| | | | HENP | 1 15/16 | 2 1/16 | 1 | | 1 | |
| HI- 22 5/8  LO- 21 3/4 | PCL- 22 1/2 | VL- 870300 | HTCH | 9 3/4 | 10 1/4 | 6 | | 2 | |
| INS- 22 1/8  22 3/8 | 10- 10 MOTC- 22 | 22 1/2 | IMNR | 3 1/8 | 3 3/8 | 3 | | 1 | |
| | | | INGR | 14 1/4 | 14 1/2 | 4 | ↑ | 10 | ↓ |
| FBCO  22 1/8 | UBSS  22 1/8 | PUNK  22 1/8 | INTC | 40 | 40 1/4 | 3 | ↑ | 23 | ↓ |
| HRZG  22 1/8 | PRUB  22 1/8 | MSCO  22 1/8 | KCSG | 11 1/2 | 12 1/2 | 2 | | 1 | |
| WEDBN 22 1/8 | WSTIJ  22 | ABSB  22 | KSWS | 15 3/4 | 16 1/2 | 8 | ↓ | 7 | ↑ |
| MOTC  22 | WARB  22 | TSCO  22 | LICIA | 10 1/2 | 11 | 1 | | 5 | |
| SELZ  22 | MONT  22 | DEAN  22 | MCAWA | 17 1/2 | 17 3/4 | 7 | | 5 | |
| OLDE  22 | RSSF  22 | SHWDL  22 | BGEN | 27 3/4 | 28 | 6 | ↑ | 9 | ↓ |
| NAWE  22 | SNCM  22 | COWN  22 | MCIC | 19 3/8 | 19 1/2 | 3 | ↑ | 8 | ↓ |
| MASH  22 | WSLS  21 7/8 | BEST  21 7/8 | MIPS | 7 3/4 | 8 | 12 | ↑ | 2 | |
| SBHU  21 7/8 | GSCO  21 7/8 | RPSC  21 7/8 | MTWO | 5 5/8 | 6 | 1 | | 3 | |

| 000 IN | S | 2500 NDCO 6 1/16 | ANY | WERT* | 4377 | 13:51-03 | 2500 | |
|---|---|---|---|---|---|---|---|---|
| 001 | S | 0 PTLX 3 5/8 | ANY | B | 4598 | 14:05-03 | 1000 E | |

023 15:03 Lastsale upper SIZE limit of 10000 broken by: 15000 USWNA 36 5/8 03:00
024 15:03 Lastsale upper SIZE limit of 10000 broken by: 25000 USWNA 36 1/2 03:00
025 15:04 Lastsale upper SIZE limit of 10000 broken by: 10000 SGAT 11 3/8 03:01

The second TICKER window provides confirmation of recent trades. For example, the second line of the TICKER window reflects an exchange of 1200 shares of MCIC stock at a price of 19½. Both of these TICKER windows are scrolled across the screen either continuously or intermittently from right to left.

Again, referring to Table 1, the LEVEL 2/3 applications comprise two separate windows. Implementation of these windows are governed by the same controlling algorithms; two windows are provided so that the trader can structure each window in a unique manner, and, therefore, track on LEVEL 2/3 two separate securities. As reflected in Table 1, LEVEL 2/3-A (the top window) is tracking shares in Apple Computer on the bid side, as indicated by the small "b" in the upper left hand corner; the information presented in this window includes high and low bids for the day, share volume, the boundaries defining the inside market, e.g., 44½-44¾, the limits for automatic trading, via SOES, e.g. 10—10 reflecting 1000 shares for both buy and sell orders, the current bid price by the trader's organization (MOTC-=Merrill Lynch). Finally, the lower portion of this window provides a listing of market makers in this security on the bid side starting with the Best Current Bid price. Continuing in Table 1, it can be seen that the second LEVEL 2/3 window is similarly organized, but, in this example, directed to shares in Sun Microsystems, Inc.

The large window, on the right side of the screen, in Table 1 is the interface to the COMPOSITE application which represents a computer generated trader's book of key securities, i.e., securities of interest to that particular trader. As presented herein, the structure of this data is a columnar listing of the selected securities with associated inside bid and ask prices. The two right hand most columns in this window indicate the number of market makers on the inside market for respectively bid and ask quotes. This number provides an indication of the depth of the market for that security. Next to each of these bid and ask market maker values is the "arrow" column, indicating the market direction. An arrow in this column means the market is moving, i.e., an up arrow indicates that more market makers are on the inside bid price. This reflects an increase in the number of potential purchasers for that stock. In a similar vein, the up arrow on the ask column reflects an increase of market makers on the inside ask price of the market. This would reflect more sellers for that security.

In Table 1, the COMPOSITE interface presents a highlighted security, "BGEN". This security is highlighted automatically by the system to reflect that the inside market has recently changed. The COMPOSITE application will also provide warnings to indicate when the trader is the sole remaining market maker on the inside market. This warning notifies the trader that his current bid pricing may be overly optimistic.

The final two windows depicted in Table 1 are the SelectNet window, second from the bottom, and the UNSOLICITED MESSAGES windows (bottom most on the screen). The SelectNet window is directed to tracking transactions using SelectNet services provided by NASDAQ. The UNSOLICITED MESSAGES window provides a listing of recent transactions that are characterized by some special distinctive quality, e.g., volume size (beyond stated limits).

Implementation of the various applications provided above is accomplished in a software language compatible to the particular hardware environment chosen. As identified above, the present invention envisions an open architecture operating system, such as UNIX, and, therefore, controlling algorithms must be programmed in a UNIX compatible language, such as "C". In addition, the use of windows to provide the interface between the trader and the application requires certain additional software packages, such as the X11 Window system. Application of these software environments has become, per se, well known to those skilled in this art. The following description of the logic flow path for the workstation applications are presented in flow chart form. The counter T is used to reference past, current and future events as sequentially tracked by the system. For example, NASD(T) is the data feed from the Host for the "T" time period.

Figure 4:
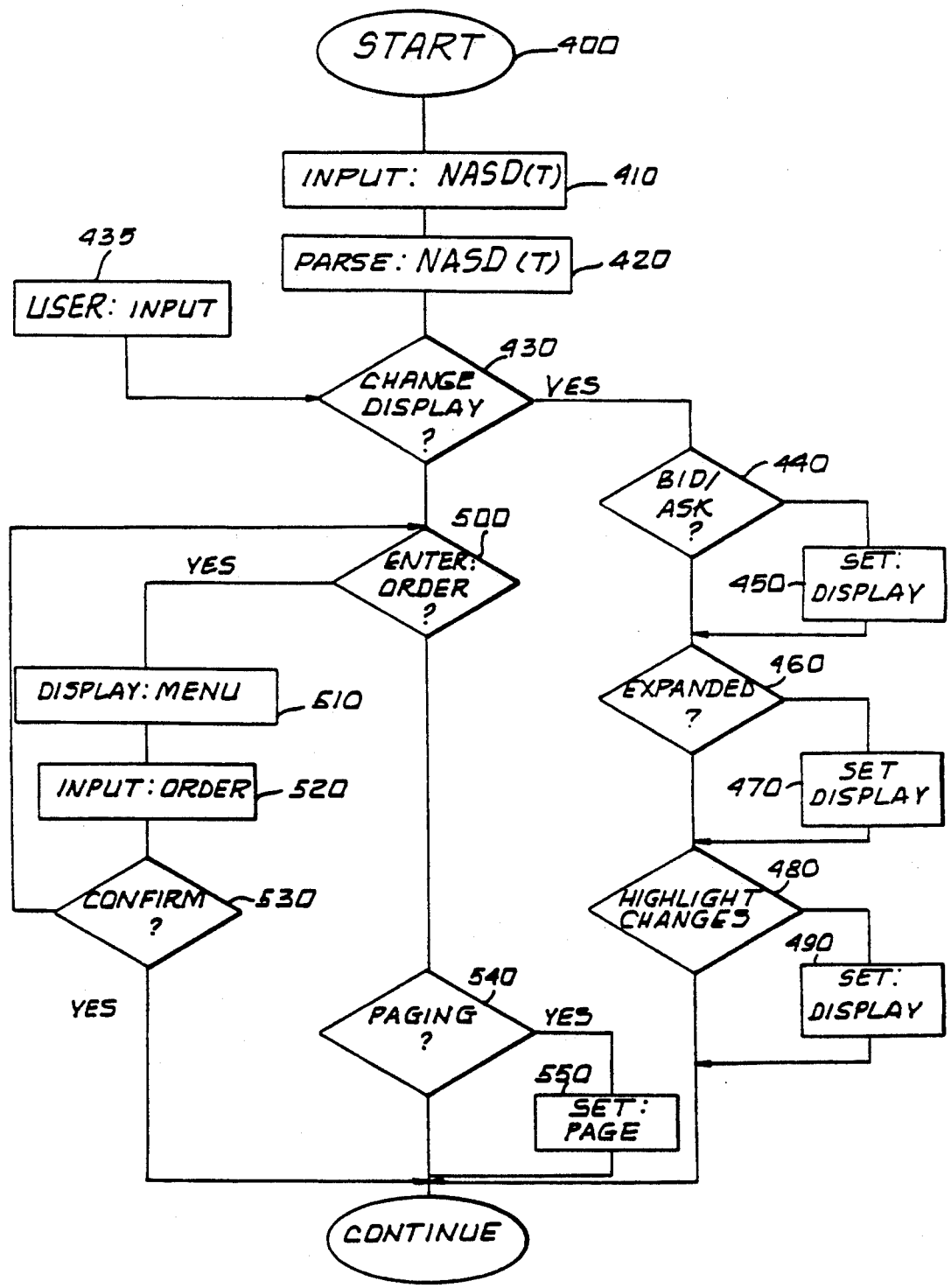
FIG. 4 provides a flow chart directed to the operation of the LEVEL 2/3 application.

Turning now to FIG. 4, the logic flow path associated with the LEVEL 2/3 application is provided. More particularly, at start block 400, logic proceeds to the receipt of the on-line datastream from the DIS data server, block 410, which is specifically parsed, block 420, for utilization by the LEVEL 2/3 application. At test 430, the system is queried as to whether display parameters should be changed. User input is received here from block 435 reflecting certain user entered data, e.g., adjusting display parameters, entering trades, etc.

Assuming a positive response to test 430, logic branches to test 440 wherein the system may be shifted from either the bid or ask side of the market for the security being displayed. This change is implemented, via block 450, and logic continues to test 460. At this test, the user may expand the display so that both sides of the market may be concurrently displayed, e.g., both inside bid and ask pricing for a given security. This change is implemented at block 470. Logic continues to test 480, wherein the user may change the highlighting associated with specific market makers which is then implemented at block 490. Assuming a negative response to test 430, logic branches to test 500 which determines whether the input is an entry of an order. A positive response to test 500, branches logic to block 510 which is a display of an order entry menu. This menu is presented within the LEVEL 2/3 window as a subsidiary window and provides a selection of order parameters to the trader. The trader thereafter inputs his trade order, block 520. Test 530 confirms this order and logic continues in real time.

Assuming a negative response to test 500, logic continues to test 540 which accesses a paging facility permitting the display of multiple pages of displayable data to the trader, block 550.

Figure 5:
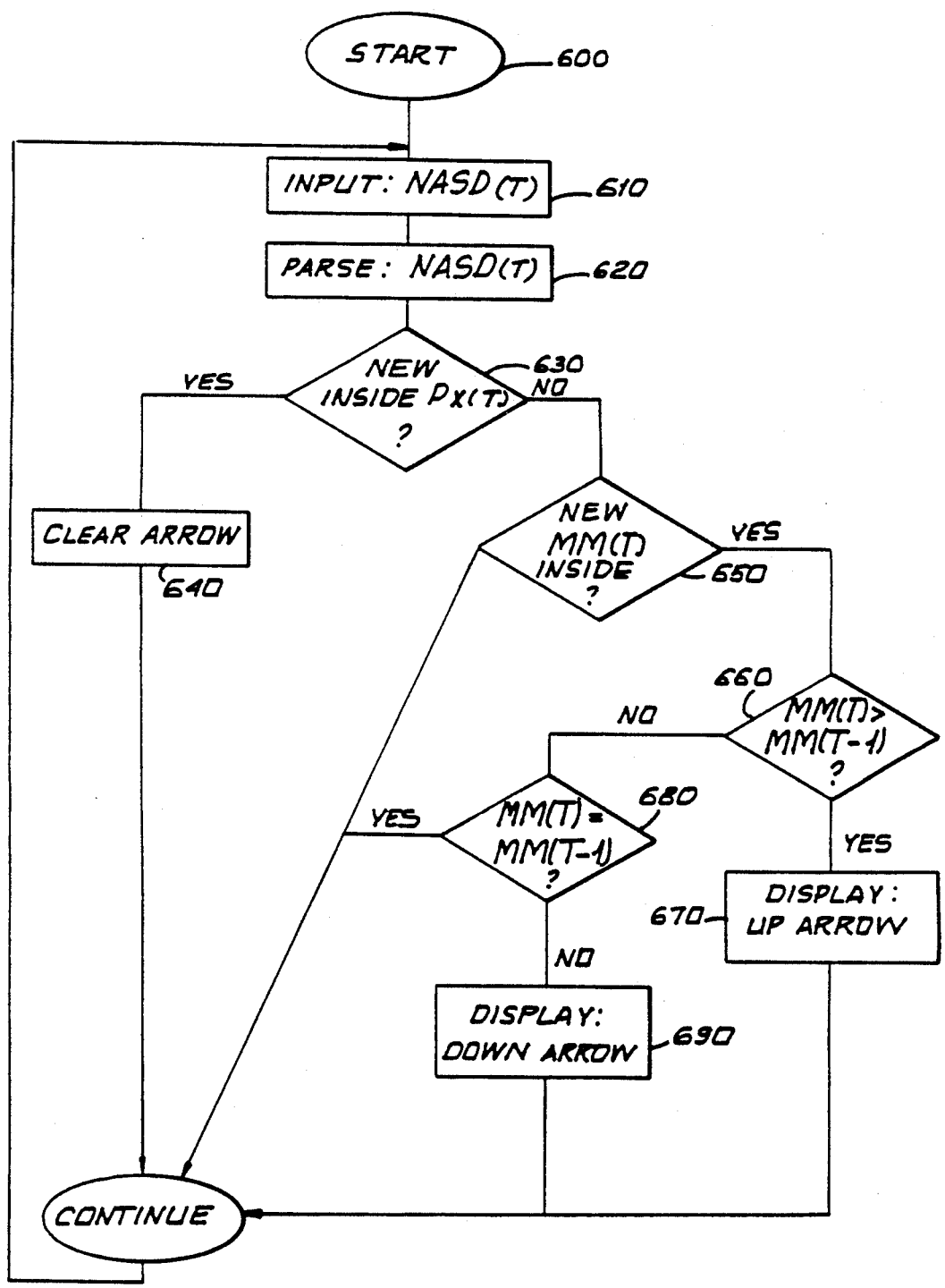
FIG. 5 provides a flow chart directed to the operation of the COMPOSITE application.

Turning now to FIG. 5, the features of the COMPOSITE application are presented in the instant logic flow chart. Beginning at start block 600, the system receives NASDAQ feed input 610 and parses this input in real time, 620. The data, as parsed from NASDAQ, will include numerous records such as the existence of new inside prices for each of the track securities PX(T) and the current total number of market makers MM(T) at an inside price at both bid and ask side. At test 630, the system determines whether the incoming records represent new inside pricing for each security tracked. As discussed above, the COMPOSITE application includes a graphical arrow reflecting the direction of the market. Upon receipt of new inside pricing, logic branches to block 640 wherein that arrow is cleared from the screen. Thereafter, logic returns to the input, block 610, for measurement of the market direction and depth. A negative response to test 630 causes logic to branch to test 650 wherein the system queries the incoming datastream for new inside market makers for that time period (T). A positive response to test 650 branches further to the quantification of the market direction, test 660. A positive response to test 660 will generate a display command for the up arrow, block 670. A negative response to test 660 shifts logic to test 680 comparing the current inside market maker total with the previous market maker total MM(T−1). If equal, no adjustment of the display arrow will be made; if not equal ("NO" to test 680), the display is configured with a down arrow for that security, block 690. In conjunction with the direction of the market, the total number of inside market makers on each side of the market (bid and ask) provides a sense of depth to the market.

Figure 6:
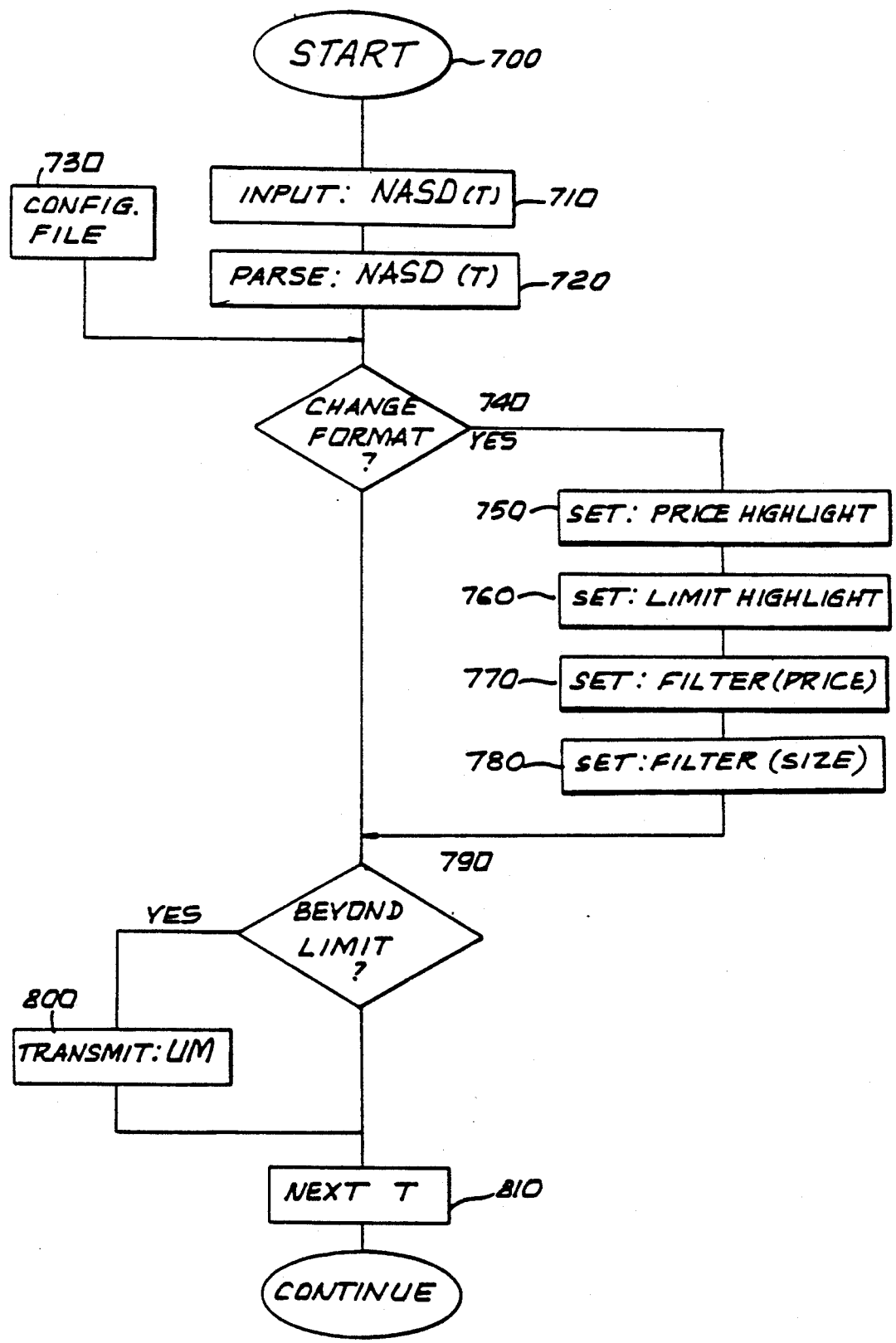
FIG. 6 provides a flow chart representation of the TICKER application.

In FIG. 6, the logic flow for the TICKER application is presented. The arrangement of the data in the TICKER window is dictated by both the incoming datastream from NASDAQ, NASD(T) and the matrix of information stored in the configuration file. Logic conceptually begins at start, block 700, and the datastream is received, block 710, and parsed for TICKER related records, block 720. The system thereafter determines whether the format needs to be changed pursuant to the data found in the configuration file, block 730. If so, a positive response to test 740 branches logic to the various restructuring options for the TICKER interface window. This includes the setting of the price highlight, block 750, indicating sales that trigger the price limit. At block 760, the sales limit highlight is established. At blocks 770 and 780 filters for price and transaction size may be established. These filters operate to exclude those sales that are insufficient to justify display to the trader.

As transactions are received, via the datastream, they are tested at test 790 to determine whether they exceed the limit previously set. If so, this information is further passed on to the UNSOLICITED MESSAGES application (UM), via block 800. This process continues, block 810, for the succeeding periods of time.

Figure 7:
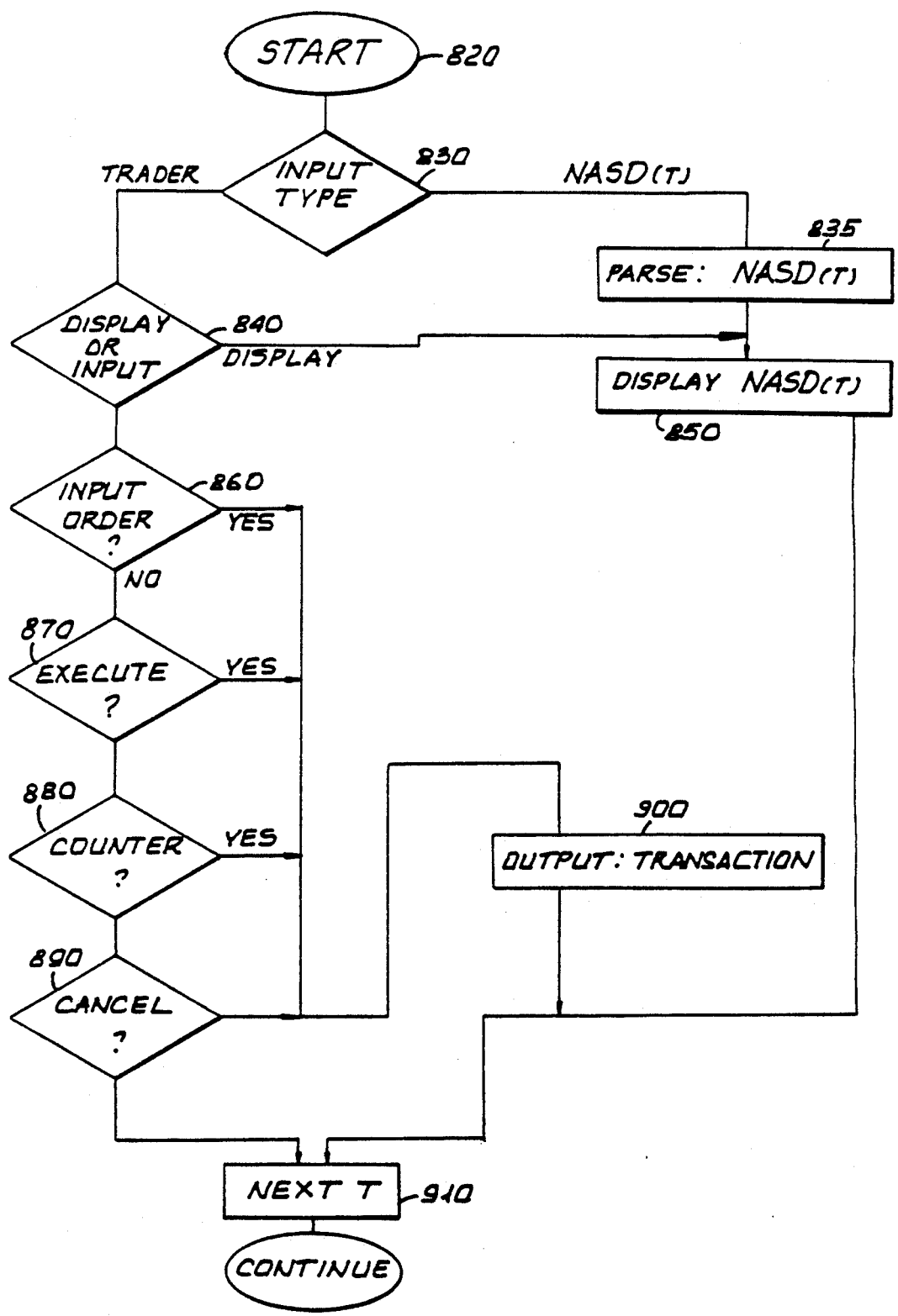
FIG. 7 provides a flow chart representation of the SelectNet application.

In addition to the above proprietary applications, the workstation permits a separate window to monitor SelectNet transactions, wherein SelectNet is a pre-existing utility provided by NASDAQ. Implementation on SelectNet through the interface window is depicted in FIG. 7. Logic begins at start, block 820, and proceeds to test 830, wherein the input data is tested as to source. Data from the trader will branch to test 840 which tests to determine whether the inputted data from the trader is to be displayed or transmitted to NASDAQ; if displayed, logic branches to display command, block 850. Otherwise, logic proceeds to test 860 regarding the transaction itself. Test 860 tests for an order by the trader within the SelectNet format. In a similar manner, test 870 permits the trader to execute an outstanding order, and test 880 permits the trader to counter an outstanding offer with a different offer. Finally, the previous offer may be canceled at test 890.

The above transactions are outputted to NASDAQ, block 900, for completion. Returning to test 830, NASDAQ feed, as an input, will branch to parse command, block 835, wherein the records associated with the SelectNet screen are parsed and sent to the display, block 850. This process is continued through to the next reporting cycle (T+1), block 910.

Figure 8:
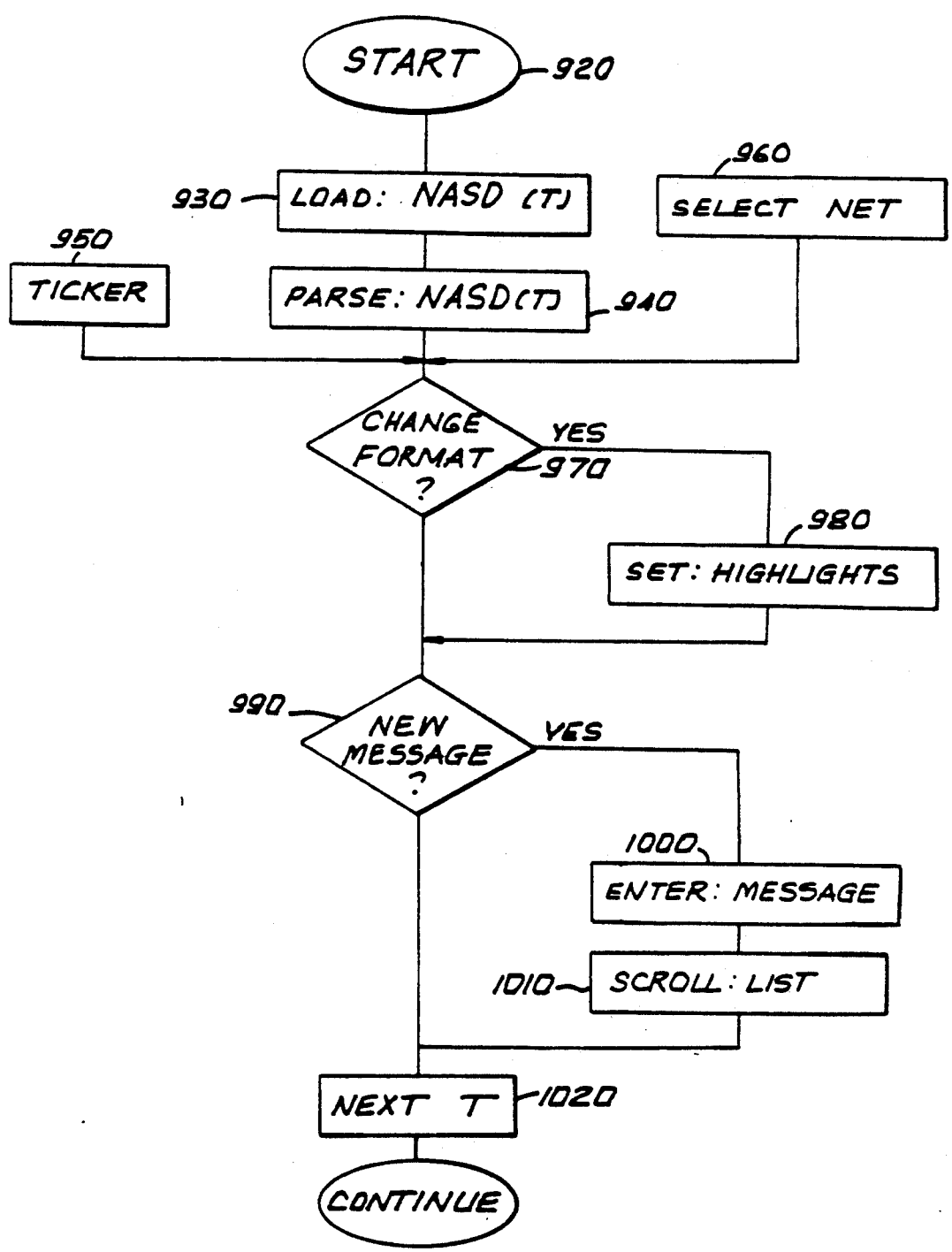
FIG. 8 provides a flow chart representation of the UNSOLICITED MESSAGES application.

Certain unique messages generated in the course of OTC trading are directed to the UNSOLICITED MESSAGES application forming the lower most window in the display screen. In FIG. 8, the logic flow path of this application begins at start, block 920. Incoming datastream from NASDAQ for time period T is loaded at bock 930 and parsed for salient records at block 940. Alternatively and contingent on limit set points in the TICKER and SelectNet applications, certain data may be transferred from these applications, as reflected in blocks 950 and 960, respectively. At test 970, the format for displaying UNSOLICITED MESSAGES may be modified; if YES to test 970, the format parameters will be entered at block 980 exemplified by such settings as information highlights. At test 990, newly received messages are entered at the top of the list, block 1000, which is then scrolled insuring a chronological presentation of the incoming messages, block 1010. This process is repeated for the next sequence of incoming data, block 1020.

Figure 9:
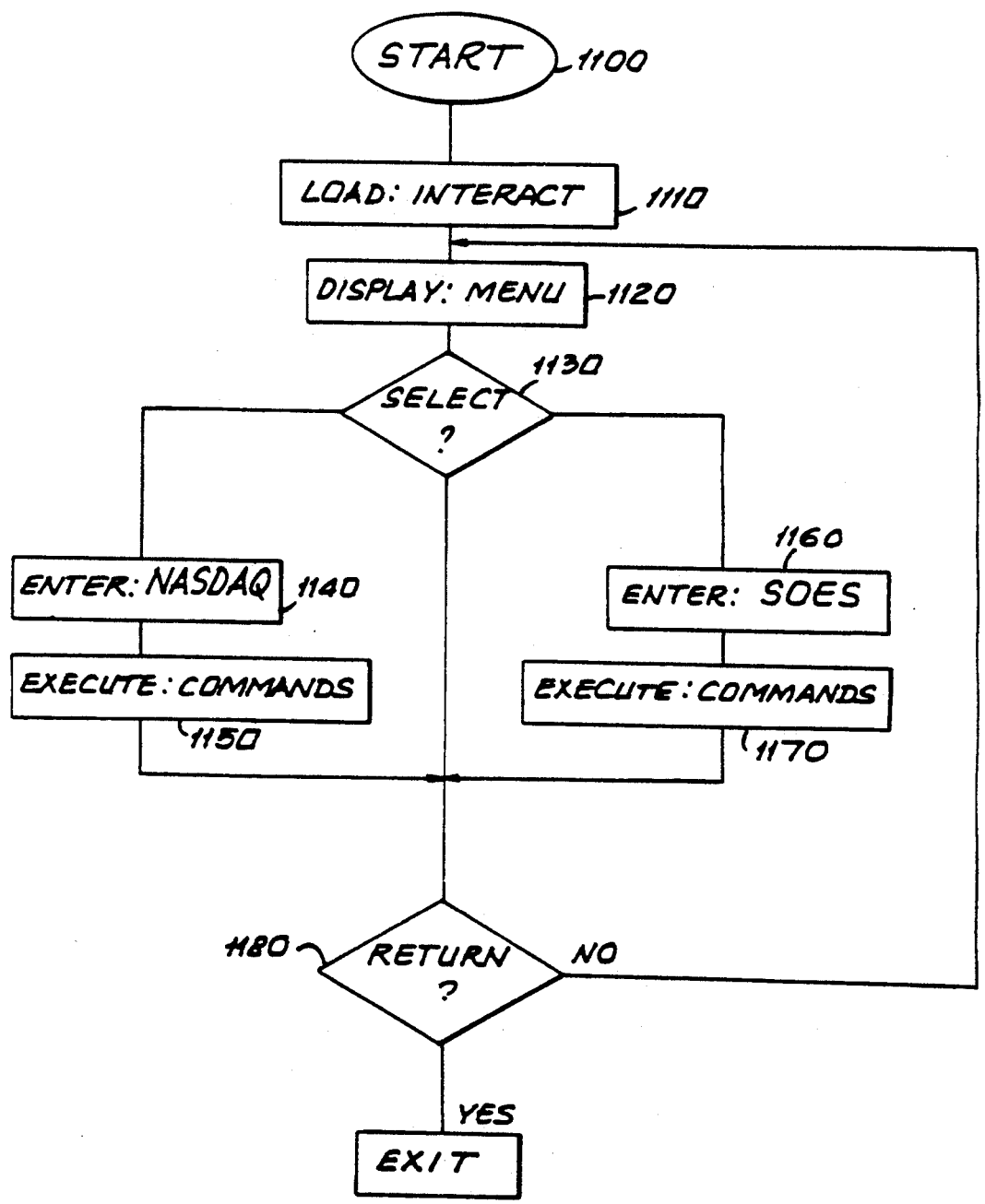
FIG. 9 provides a flow chart representation for the INTERACT subroutine.

Now referring to FIG. 9, a separate utility called the interactive window is described in logic flow chart form. The interactive window permits access to the various other services provided by NASDAQ without departure from the workstation environment. Logic begins at start block 1100. The INTERACT application is loaded, block 1110, which thereafter provides a menu of options to the user, block 1120 at test 1130. The user enters his selection; for illustrative purposes, FIG. 9 provides two potential services. The left branch of test 1130 is for the NASDAQ function menu, which includes entry into such functions as the Harris terminal function, statistics and index calls, block 1140. These functions may be executed, via block 1150. The right side branch of test 1130 reflects entry into the SOES function menu, block 1160, wherein SOES (small order execution service) orders may be entered, block 1170. The SOES system is directed to the smaller size trades that may be effected directly by computer. The INTERACT utility is departed by a negative response to test 1180.

Figure 10:
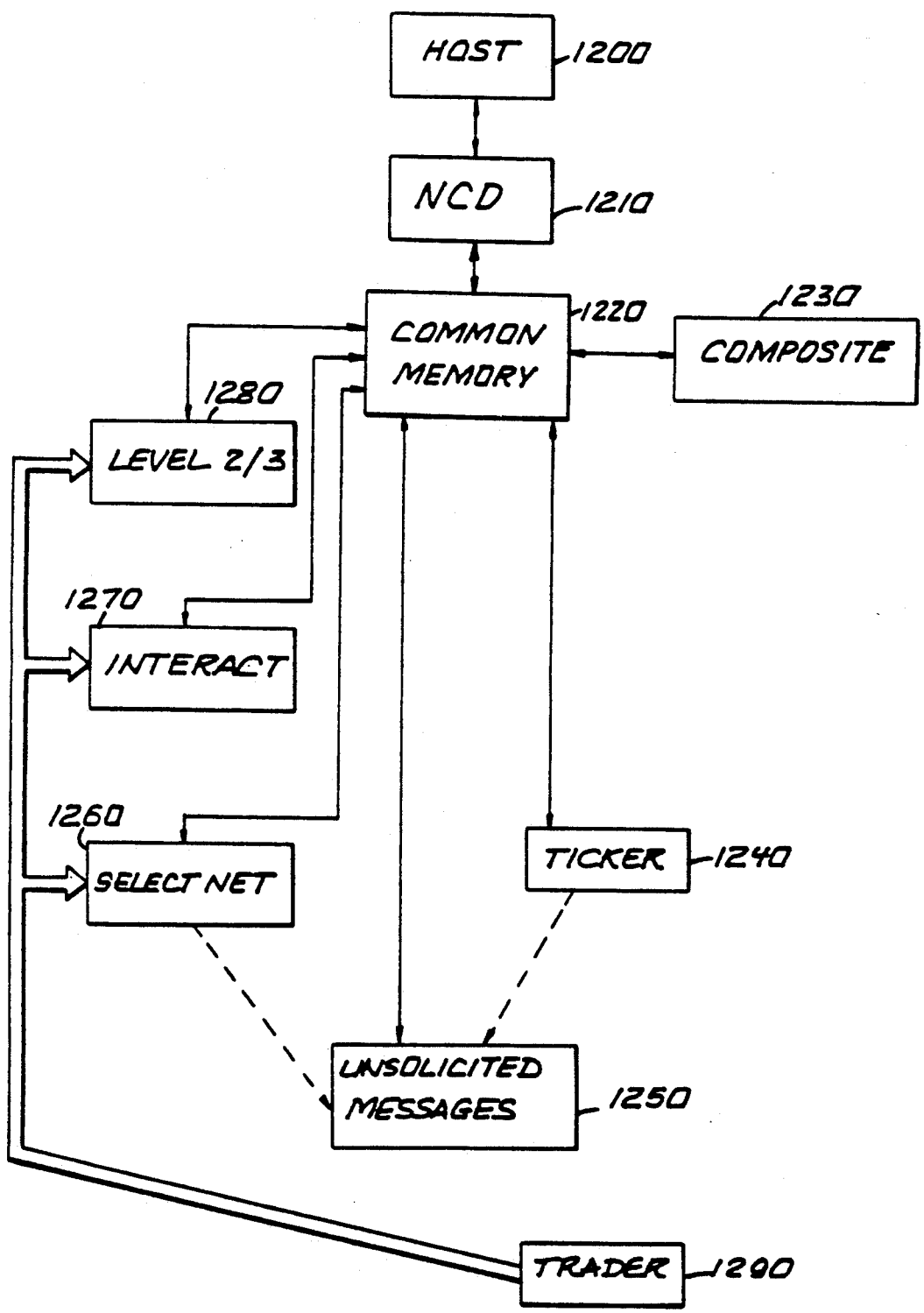
FIG. 10 provides a block diagram depicting the communication pathways for information between the trader workstation and NASDAQ.

Turning now to FIG. 10, a block diagram is presented that reflects the communications pathway between NASDAQ and the select applications discussed above. In this diagram, the Host, block 1200, is in communication with the workstation common memory, via the communications applications NCD, block 1210. Information between the Host and the various applications are channeled through the common memory, block 1220, and stacked in message queue. In this regard, it can be seen that UNSOLICITED MESSAGES application 1250 receives information from both common memory, e.g., NASDAQ feed, the TICKER 1240, and SelectNet 1260. The trader 1290 may communicate, via keyboard input through each of the LEVEL 2/3 applications 1280, INTERACT 1270 and SelectNet 1260.

The above-described arrangement is merely illustrative of the principles of the present invention. Numerous modifications and adaptations thereof will be readily apparent to those skilled in the art without departing from the spirit and scope of the present invention.

What is claimed is:

1. In combination in a system for controlling the operation of a trader work station as integrated in a network for the trading of financial instruments wherein a database is configured to deliver an on-line datastream to a plurality of traders said system comprising:

data communication means for managing the transfer of on-line data from said database to the work station and the transfer of trader selected transactions to said database;

data compilation means for providing select records to a plurality of separate window interface applications;

market maker application means for displaying a select security and associated market makers with current price quote information, and further permitting the entry of a transaction order by the trader for transmission to the database; and trader book application means for displaying a select group of securities associated with an individual trader wherein said group of securities include current data on an inside market, depth of said inside market, and direction of said inside market for each security in said group.

2. The system of claim 1 wherein said market maker application means includes high and low price trades, trading volume, inside market quotes and transaction limits.

3. The system of claim 2 wherein said trader book application means includes means to display a bid side of the market in expanded format.

4. The system of claim 3 wherein said trader book application means includes highlighting of a security in said group of securities upon a receipt of a change of an inside market for the respective security from said database.

5. A data processing system for controlling a trader workstation with display means wherein said workstation is in communication with a remote database having stored securities related transactional data, said workstation comprising:

ticker means for receiving an incoming datastream from said remote database and displaying in real time on said display means current bid and ask price quote data for individual securities and market makers;

level 2/3 means for tracking and displaying a bid and ask side of a market for a select security and a listing of current market makers for said select security; and composite means for tracking and displaying a depth of market and direction of market for a plurality of individual securities.

6. The system of claim 5 wherein said workstation display means includes plural windows for trader interface with stored application programs.

7. The system of claim 6 further comprising a configuration file means for controlling data display on said display means.

8. The system of claim 7 further comprising a communications linkage means for managing the transfer of message queues between said remote database and said workstation.

* * * * *